Feb. 17, 1970 E. L. SWARTZ 3,495,609

FLUID INDUCTION AMPLIFIER

Filed July 3, 1967

INVENTOR,
ELMER L. SWARTZ

BY Harry M. Saragovitz,
Edward J. Kelly, Herbert Berl
& J. D. Edgerton ATTORNEYS United States Patent Office 3,495,609

Patented Feb. 17, 1970

3,495,609

FLUID INDUCTION AMPLIFIER

Elmer L. Swartz, Falls Church, Va., assignor to the United States of America as represented by the Secretary of the Army Filed July 3, 1967, Ser. No. 651,044

Int. Cl. F15c *1/04*

U.S. Cl. 137—81.5 7 Claims

ABSTRACT OF THE DISCLOSURE

A bistable amplifier is designed to control a high energy fluid stream by a low energy fluid stream without co-mingling of the two fluid streams. This is accomplished by having the high energy fluid stream directed into an interaction chamber. Adjacent the high energy fluid stream and on opposite sides of the high energy fluid stream are a pair of aspirator channels. The low energy fluid stream is directed past one of the aspirator channels lowering the pressure in the aspirator channel and inducing the high energy fluid stream to move toward the aspirator channel which has low energy fluid stream directed therepast.

Background of the invention

This invention relates to fluid amplifiers and in particular to a bistable induction amplifier wherein a high energy fluid stream is controlled by a low energy fluid stream without co-mingling of the fluid streams.

Fluid amplifiers have only recently been invented and because of their simplicity of operation, which entails no moving parts, they have been finding widespread use. Fluid amplifiers can be classified as bistable or proportional. In a bistable fluid amplifier a high energy fluid stream is directed to one of a plurality of output passages by a low energy fluid stream while in a proportional amplifier the high energy fluid stream can be continuously varied between a plurality of output passages by the low energy fluid stream. To obtain a high gain for a fluid amplifier it is generally necessary to stage a series of fluid amplifiers. This involves connecting the output conduits of one fluid amplifier to the control conduits of a second fluid amplifier. When the output conduits of one fluid amplifier are connected to the control conduits of a second amplifier there exists the undesirable characteristic that when the first fluid amplifier switches out of control of the second a rarefaction wave is formed. This wave causes the second amplifier to perform an unwanted switch. In the past this problem has been circumvented by using special bleeds.

In the conventional bistable fluid amplifiers the impedance is a function of the power jet pressure and the position of the power jet relative to the respective sidewalls. Thus it can be seen that the impedance is not constant throughout all flow conditions rendering the amplifier less effective for use in logic systems.

It is therefore an object of the present invention to provide an improved close wall or bistable fluid amplifier.

A further object of the present invention is to provide a fluid amplifier that is capable of being staged with a second fluid amplifier and wherein the fluid amplifiers are decoupled in the absence of a controlling signal.

Yet another object of the present invention is the design of the low impedance fluid amplifier of lock-on or bistable type wherein the impedance does not vary with fluctuations in the power jet pressure.

Still a further object of the present invention is to provide a fluid amplifier of the lock-on or bistable type that has a high pressure gain and a high pressure recovery.

A final object of the present invention is to provide a fluid amplifier wherein the control of a high energy fluid stream can be accomplished with a low energy fluid stream without co-mingling of the fluid streams.

Summary of the invention

Briefly, in accordance with the present invention, a bistable fluid amplifier has a high energy fluid jet directed into an interaction chamber. Adjacent the high energy stream and on either side thereof are a pair of aspirator channels. A low energy jet directed across the mouth of an aspirator channel will lower the pressure in the aspirator channel inducing the high energy stream to attach to the sidewall adjacent the aspirator channel which has the low energy stream directed adjacent thereto. By this design it is possible to control a high energy fluid stream by a low energy fluid stream and avoid co-mingling of the fluid streams.

Brief description of the preferred embodiment

Figure 1:
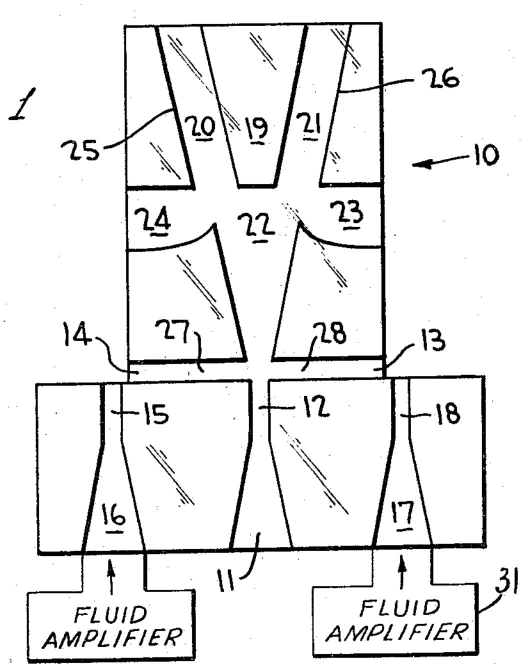
FIGURE 1 is a schematic illustration of an induction amplifier in accordance with the present invention.

In FIGURE 1 an induction bistable amplifier 10 is shown having a power intake port 11 which is connected to a power nozzle 12 to direct a power jet into an interaction chamber 22. On opposite sides of the power jet which will issue from power nozzle 12 are a left aspirator channel 27 and a right aspirator channel 28. Each of the aspirator channels are equal length and are directly opposite each other. A control port 16, by a nozzle 15, is adapted to direct a control signal past end 14 of aspirator channel 27. Similarly positioned on the right side of induction amplifier 10 is a control port 17 and a control nozzle 18 which is adapted to direct a control signal past end 13 of aspirator channel 28. Interaction chamber 22 is bounded by a left sidewall 25 and a right sidewall 26 making the amplifier bistable. A splitter 19 along with left sidewall 25 serves to define a left output passage 20 while a right output passage 21 is defined by splitter 19 and right sidewall 26. A left bleed 24 and a right bleed 23 communicate interaction chamber 22 to atmosphere in a manner well known in the art.

Figure 2:
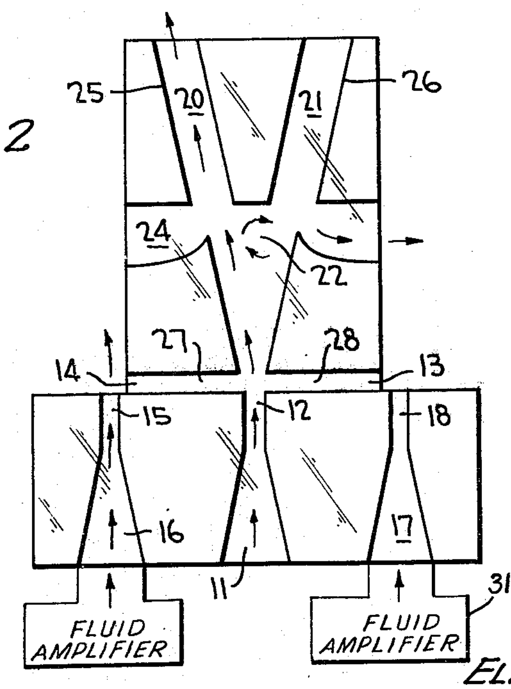
FIGURE 2 is a schematic illustration of flow in the induction amplifier illustarted in FIGURE 1.

In normal operation the power fluid will be supplied to power port 11 and by nozzle 12 directed as a jet into interaction chamber 22. If a control signal is applied to port 16, as shown in FIG. 2, it will flow past end 14 of aspirator channel 27. When a power jet issues from power nozzle 12 it will entrain fluid from aspirator channels 27 and 28. This will lower the pressure in each aspirator channel. Normally the fluid that is removed from the aspirator channel by the entrainment action of the power jet will be replaced by air drawn from ambient to the aspirator channel from the end furtherest away from the interaction chamber. However, when a control signal is supplied to control port 16 and directed as a jet by control nozzle 15 past end 14 of channel 27 the control fluid will block communication of aspirator channel 27 and ambient lowering the pressure in aspirator channel 27. There will not be correspondingly lowered pressure in right aspirator channel 28 due to the entrainment effect of the power jet because there will be no fluid issuing from control nozzle 18 blocking end 13 of aspirator channel 28 from ambient and any fluid from the aspirator channel that is entrained by the power jet issuing from power nozzle 12 can readily be replaced through opening 13. Thus, since aspirator channel 28 will be at a significantly higher pressure than aspirator channel 27, the power jet will be directed to the low pressure region, in this case adjacent aspirator channel 27, and will lock-on to sidewall 25 and issue from output passage 20. It is obvious that if a control signal were applied to control port 17, in the absence of a control signal applied to port 17, the opposite effect would occur.

The fluid induction amplifier has a constant low input impedance which is the physical restriction of the aspirator channel. Because the impedance is related directly to the restriction of the aspirator channel it is not affected by pressure variations of the power jet thus overcoming a major deficiency in prior art fluid amplifiers. The input impedance of the induction amplifier can simply be changed by merely altering the width of the aspirator channel.

The position of bleeds 23 and 24 and the induction principle which I have employed in the design of my fluid amplifier serves to decouple a fluid amplifier as shown in the figures from a fluid amplifier to which it may be staged thus avoiding unwanted switching upon the formation of a rarefaction wave in one of the fluid amplifiers.

I wish it to be understood that I do not desire to be limited to the exact details of construction shown and described, for obvious modifications will occur to a person skilled in the art.

I claim:

1. A fluid amplifier comprising:

(a) an interaction chamber, (b) a power nozzle symmetrical about an axis and adapted to receive power fluid to form a power jet and direct said power jet into said interaction chamber, (c) first and second output passages in communication with said interaction chamber to receive said power jet, (d) first and second aspirator channels respectively adjacent said first and second output passages symmetrical about an axis in communication with said interaction chamber, each aspirator channel having an inner end in communication with said interaction chamber and an outer end oppositely placed from said inner end and in communication with ambient, (e) first control nozzle located adjacent the outer end of said first aspirator channel and having an output in communication with ambient, said first control nozzle issuing a fluid similar to said power fluid in said fluid amplifier, and (f) means adjacent said first control nozzle to activate said control nozzle and to cause said power jet to exit through said first output passage.

2. A device according to claim 1 wherein said control fluid is directed substantially perpendicular to said axis of said first aspirator channel.

3. A device according to claim 2 wherein said control nozzle axis and said power nozzle axis are substantially parallel.

4. A device according to claim 3 wherein the axis of said second control nozzle is substantially parallel to the axis of said first control nozzle.

5. The device according to claim 1 wherein said means adjacent said control nozzle is the output of a fluid amplifier connected in cascade.

6. The device according to claim 1 comprising a second control nozzle located adjacent the outer end of said second aspirator, said second control nozzle having an output in communication with ambient and issuing a fluid similar to said power fluid in said fluid amplifier, and means adjacent said second control nozzle to activate said second control nozzle and to cause said power jet to exit through said output passage.

7. The device according to claim 6 wherein said means adjacent said second control nozzle is the output of a fluid amplifier connected in cascade.

References Cited

UNITED STATES PATENTS

| | | | |
|---|---|---|---|
| 3,034,628 | 5/1962 | Wadey | 137—81.5 |
| 3,191,008 | 6/1965 | Wadey | 137—81.5 XR |
| 3,232,095 | 2/1966 | Symnoski et al. | 137—81.5 XR |
| 3,263,501 | 8/1966 | Bowles. | |
| 3,324,730 | 6/1967 | Bowles | 73—515 |
| 3,371,540 | 3/1968 | Colombani et al. | 137—81.5 XR |
| 3,386,709 | 6/1968 | Drayer | 137—81.5 XR |
| 3,417,770 | 12/1968 | Denison | 137—81.5 |

SAMUEL SCOTT, Primary Examiner